May 9, 1944.　　　A. L. PARKER　　　2,348,641

ELECTRIC CABLE

Filed March 31, 1941

Inventor
Arthur L. Parker
By Mason & Porter
Attorneys

Patented May 9, 1944

2,348,641

UNITED STATES PATENT OFFICE 2,348,641

ELECTRIC CABLE

Arthur L. Parker, Cleveland, Ohio, assignor to The Parker Appliance Company, Cleveland, Ohio, a corporation of Ohio Application March 31, 1941, Serial No. 386,222

1 Claim. (Cl. 174—102)

The invention relates to new and useful improvements in an electric cable used in aircraft construction.

An object of the invention is to provide an electric cable having an insulating sheathing for the electric conductor which sheathing is protected by a metal tubing having closely spaced annular grooves which facilitates the curving and flexing of the cable.

A further object of the invention is to provide an electric cable of the above type whereon said grooves are shaped and disposed relative to each other so as to produce a sinuous line in a direction lengthwise of the tubing.

Figure 2:
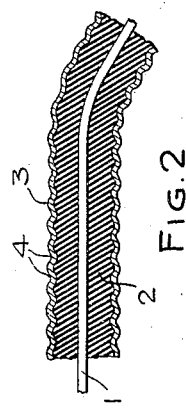
Figure 2 is a view similar to Figure 1 showing the metal tube subjected to a crimping or corrugating action for joining the metal tube to the sheathing and for rendering said metal tube flexible.

The improved electric cable embodying my invention is shown in Figure 2 of the drawing. Said cable includes an electric cable wire 1. Surrounding the wire 1 is an insulated sheathing 2 of considerable thickness. This sheathing may be made of rubber or any other suitable flexible insulating material. The sheathing has a central passage therethrough for the wire. Surrounding the sheathing is a metal protector tube 3. This protector tube is provided with closely spaced annular grooves 4, 4 the grooves and the rib therebetween are shaped so as to form in cross section, a sinuous line extending longitudinally, of the tubing. This grooving of the tube may be accomplished at a desired way. When the metal tubing is grooved the inwardly bent parts become imbedded in the insulating sheathing and join the sheathing and metal tubing firmly in an assembled unit. Inasmuch as the sheathing is of flexible material, the tubing when shaped as described above, is flexible and can be readily curved as desired.

In making the cable the following method is preferably used. The electric wire 1 is threaded through a preformed sheathing of insulating material and a metal tube 3 is placed over the sheathing. After the parts have been thus assembled the metal tube is subjected to a grooving or corrugating apparatus which provides grooves which are closely spaced with curved ribs therebetween. The inwardly curved parts become imbedded in the insulating sheathing and thus firmly grip the sheathing and this will hold the parts firmly united as a unit. This grooving of the metal tubing also greatly facilitates the flexing of the tubing so that the electric cable may be readily curved by hand to any desired shaping relative to the parts with which it is associated.

Figure 4:
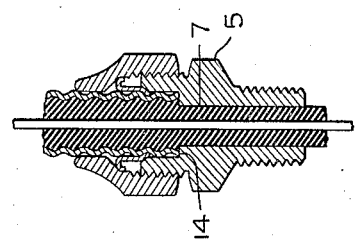
Figure 4 is a view similar to Figure 3 but showing the coupling closed and clamping the cable.
Figure 1:
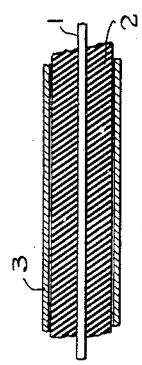
Figure 1 is a sectional view showing an electric wire, an insulating sheathing and a protecting metal tube assembled preparatory to the shaping of the tube for joining the tube to the sheathing.
Figure 3:
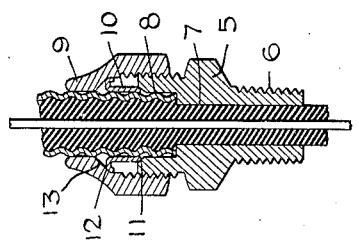
Figure 3 is a sectional view illustrating the improved electric cable connected in a coupling structure, the securing of the cable being only partially complete.

In Figures 3 and 4 of the drawing there is illustrated the manner in which the improved cable can be connected in a coupling. The coupling includes a member 5 having a threaded shank 6 for attachment to a fixed part. This coupling member has a bore 7 therethrough and a counter bore 8. The metal tubing is stripped from the cable for a distance back from the free end. A nut 9 is placed on the cable and a locking sleeve 10 which is associated therewith is also placed on to the cable. The end of the cable from which the metal tubing has been stripped is inserted in the coupling member 5 with the metal tubing extending into the counter bore 8 and contacting with the seat or shoulder 14 at the inner end thereof. The end of the locking sleeve adjacent to the coupling 5 is curved on its outer face as at 11. This locking sleeve is also curved outwardly at its other end as indicated at 12. When the nut 9 is threaded on to the coupling 5 the inclined face 13 of the nut will contact with the outwardly curved end of the locking sleeve and force the sleeve into engagement with a camming shoulder on the coupling 5. This will cause the end of the locking sleeve adjacent to coupling 5 to be contracted and forced into gripping contact with the metal tube. When the sleeve is brought into engagement with the metal tube it will force the free end of the tube against the seat end 14. Thus the cable will be very firmly clamped to the coupling members.

I claim:

An electric cable comprising a metal flexible core, a sheathing of readily deformable flexible insulating material surrounding the core and a flexible metal tube surrounding the sheathing, said tube being shaped so as to provide closely spaced annular ribs and grooves each lying perpendicular to the axis of the cable and merging one into the other so as to present, in cross section extending longitudinally of the sheathing, a sinuous line, said sheathing being dimensioned so that the inwardly curved parts are fully embedded in the insulating material whereby the insulating material makes intimate contact with the sheathing from one end thereof to the other.

ARTHUR L. PARKER.